Sept. 7, 1943.  A. W. FULLER  2,329,042
METHOD OF TESTING GAS METERS
Filed June 24, 1942
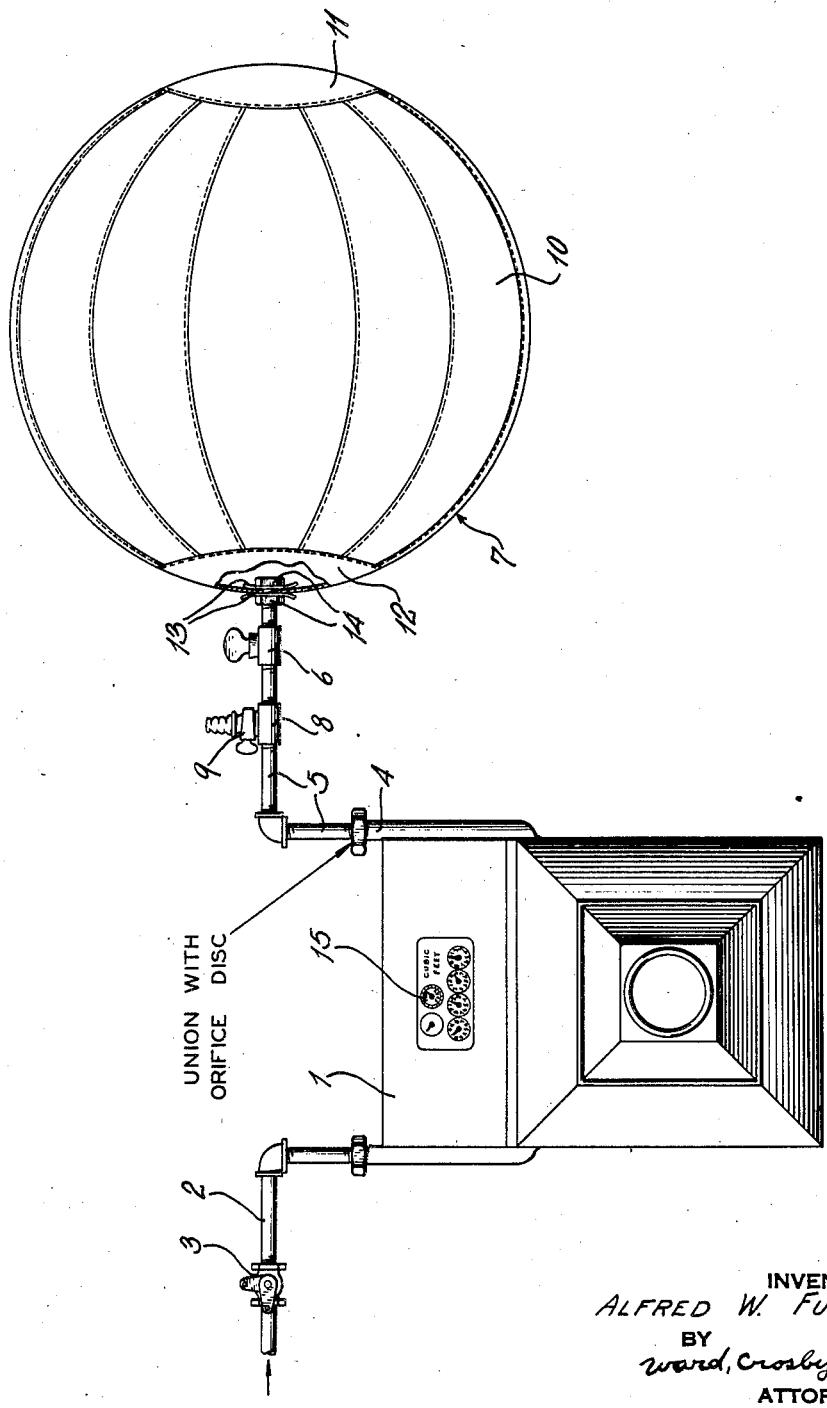
INVENTOR
ALFRED W. FULLER
BY
ward, Crosby & Neal
ATTORNEYS Patented Sept. 7, 1943

2,329,042

UNITED STATES PATENT OFFICE 2,329,042

METHOD OF TESTING GAS METERS

Alfred W. Fuller, Short Hills, N. J., assignor to Consolidated Edison Company of New York, Inc., New York, N. Y., a corporation of New York Application June 24, 1942, Serial No. 448,253

5 Claims. (Cl. 73—51)

This invention relates to a method of testing gas meters, and is particularly adapted for testing meters of small capacity in the field while same remain connected to the gas supply mains.

With the gas distribution systems of typical cities, well over 90% of the gas meters are of the small five-light capacity, and the field testing of such meters economically presents a problem which has heretofore not been satisfactorily solved. Testing methods, involving the measurement of gas flow through the meters by the use of orifices, has long been successfully carried out for large gas metering installations. But these methods require trained technicians to make corrections for different gravities of the gas at various points on the distribution system, and require careful work in the taking of time and temperature readings. The use of test meters to be carried about and connected in series with meters in use in the field, ordinarily requires trucks for transporting the equipment, and involves uncertainties due to the changes in temperature of the test meter when brought from outdoors into different buildings. Also the operator can never be certain that the test meter is continuing to maintain its accuracy when being thus carried around. So far as is known, the only method other than the use of such test meters, which has been attempted for the field testing of small gas meters, has involved passing a volume of gas through the meter to be tested and thence into a cylinder having a piston actuated by a hand crank and having a known displacement for a fixed stroke. This method also required a truck for transporting the equipment. It necessitates the burning of considerable gas during the test and involves uncertainties due to temperature conditions and other factors, particularly if the piston is not moved carefully at a predetermined rate.

The present invention avoids the above mentioned difficulties and provides a simple method which may be carried out quickly and accurately by a relatively unskilled workman, and all of the required apparatus may be conveniently carried about on his person.

According to this invention, an envelope or bag while collapsed to a negligible capacity, is connected to the outlet of the meter and thereafter sufficient gas is passed through the meter into the envelope to fully inflate the latter. The walls of the envelope are made substantially non-elastic so that upon full inflation the envelope will have a fixed predetermined capacity. Readings on the "proving circle" of the meter may be made before and after the envelope is thus inflated, so that the difference between such readings may be compared with the known capacity of the envelope.

Various further and more specific objects, features and advantages of the invention will appear from the detailed description given below taken in connection with the accompanying drawing which forms a part of this specification and illustrates merely by way of example, a preferred form of the invention. The invention consists in such novel features as may be shown and described in connection with the apparatus herein disclosed, and also such novel combinations of method steps as are disclosed and described hereinafter.

The drawing illustrates a preferred form of the apparatus for carrying out the invention, and in which a small sized gas meter of five-light capacity is shown at 1 as installed in the field, connected through pipe 2 running to the gas distribution main through a shut-off valve 3. When the meter is to be tested, its outlet 4 is connected through suitable piping as at 5 and a shut-off valve as at 6 to a flexible envelope or bag 7. A T fitting 8 having a safety hose cock 9 is also preferably interposed ahead of the shut-off valve 6.

Regulations usually require that meters of this type be tested or proved on check runs with a low rate of flow, for example, at one-fifth of the so-called "badged" capacity of the meter. That is, if the "badged" capacity is 150 cubic feet per hour, then the test is to be conducted with a flow rate of 30 cubic feet per hour. With the apparatus of the present invention the flow may be readily reduced to approximately such rate by inserting during the test, an orifice in the union at the meter outlet, as indicated on the drawing. The proper size of aperture for such orifice may readily be determined by well-known methods, and will of course depend upon the normal gas pressure of the system. It should be understood that this orifice is not used according to the present invention to measure the rate of flow, but merely to reduce the rate of flow during the test, to approximately the required small proportion of the "badged" capacity of the meter.

The parts at 5 to 9 inclusive and the orifice are all that ordinarily need be carried around by the workman for testing meters in the field, and these parts may be readily connected as shown, on shutting the valve 3 and disconnecting the gas piping from the outlet connection of the meter.

The bag or envelope 7 may be formed of relatively thin flexible material which is substantially non-elastic and preferably a relatively poor conductor of heat. For example, cloth made from glass fiber, or preferably leather, may be used for this purpose. In order to render the material impervious to gas, it is coated or impregnated with some suitable known vinyl resin composition, lacquer or other synthetic binder material of a type preferably highly resistant to the light oils present in the gas. A synthetic rubber composition such as that commercially known as neoprene might be used for this purpose on a glass cloth bag, but I have found that a leather bag coated with any suitable oil resistant vinyl resin composition will withstand the operating conditions for a longer period.

The envelope or container 7 is preferably formed by sewing together pieces of the cloth or leather so shaped that when the device is fully inflated, all of its surfaces will be smoothly and convexly curved. Hence when fully inflated under pressures of the magnitude of those present in the usual gas distribution system, the shape will be such, considering the non-elastic character of the material, that there will be no uncertainty about the capacity of the container. As shown in the drawing, a spherical form is preferred, which may be made up of a plurality of segments as at 10, sewed together along their sides and sewed at their ends to circular pieces of the fabric or cloth as at 11 and 12.

A gas connection may be brought through the circular piece 12, which may be sealed in respect to the pipe as by a pair of washers 13 clamped in place on the inside and outside surfaces respectively of the bag, as by nuts 14.

Repeated tests have shown that the maximum change of volume of an envelope made in this manner when fully inflated by gas as in use, will be less than 1%. This is well within the limits of accuracy required for the purpose. In the usual case, the envelope may be designed to have a capacity of 2 cubic feet so as to receive a volume of gas normally sufficient to cause the "proving circle" pointer 15 on the usual gas meter (which is marked "2" cubic feet") to make one complete revolution in filling the envelope from its completely collapsed condition to its fully inflated condition.

When the envelope 7 is to be carried by the workman from place to place, it may be readily collapsed by pushing the upper hemisphere down into contact with the inside of the lower hemisphere. Then one quarter segment may be pushed into contact with the remaining quarter segment. Thereupon starting at the end 11, the bag may be rolled up against the gas inlet nipple. Then the rolled-up bag together with the associated fittings is ready to be carried in the pocket.

The apparatus may be used according to the following method. Upon arrival at a meter installation which is to be tested, the shut-off valve as at 3 is closed. Then the piping at the outlet of the meter is uncoupled and replaced by the fitting as shown, with the envelope 7 still fully collapsed, to expel all gas or air, and with the shut-off cock 6 closed. Thereupon the safety hose cock 9 is opened slightly, valve 3 is fully opened, and the gas coming from the safety hose cock is lighted. Gas is thus burned until the "proving circle" pointer 15 comes around (counter-clockwise) to a dial mark on the "up stroke" of the pointer, for example the "3:00 o'clock" mark. Meters are normally so constructed that lost motion in the operating connections to this pointer will be taken up, when the pointer is on its "up stroke." The safety hose cock 9 is now closed. The procedure thus far will serve to provide a "small light test" to insure that the meter is registering at very low rates of flow, and at the same time bring the test pointer to a position facilitating accurate and certain determination of the amount by which the reading is increased during the subsequent test. The valve 6 is now opened and left open until the envelope 7 is fully inflated, i. e., until all of the surface areas are pushed out convexly to form a smooth sphere and until the "proving circle" pointer 15 stops moving. After the envelope is fully inflated, the "proving circle" pointer may be watched for a few moments to make sure that no gas is escaping from the envelope or its connections either through any leakage due to deterioration of the envelope walls or because of faulty connections. If the "proving circle" pointer thus remains stationary for a few moments at a point more than 360° from its initial position when the bag was collapsed, then the meter is fast and is ordered to be exchanged. If the test pointer has turned to a question estimated to be some 8° or more short of one complete revolution, then the meter is considered to be over 2% slow and is ordered to be exchanged.

After noting the reading of the test pointer, the valves 3 and 6 are closed and the inflated envelope, together with fittings 5, 6, 8 and 9, and the orifice, are removed and replaced by the normal outlet connections from the meter. The envelope may be then carried outdoors and the gas therein discharged to the atmosphere while the bag is being collapsed and rolled up. Since the orifice may be taken out of the outlet union upon disconnection of the latter, the envelope may be quickly deflated without requiring the gas to be expelled through the small aperture of the orifice.

The above method of testing eliminates any errors due to change of volume of the gas resulting from changing humidity and temperature. Since the apparatus may all be carried on the person of the user and the envelope is composed of a substantially non-heat conductive material, it is unnecessary to allow the equipment to stand for a considerable time for temperature conditioning when it is brought indoors for use, as is the case with test meters or other equipment of types capable of absorbing considerable heat. Since during the test the gas flows through the meter and into the collapsed envelope under its normal pressure and with the low rate of flow normally required for such tests, no errors will occur due to abnormal rate of flow or abnormally rapid expansion and consequent cooling of the gas, as would be the case if the gas were expanded into an evacuated container or forcefully sucked into a cylinder by a piston at an uncertain rate. If the apparatus as applied has any leakage, the above described method of operation will immediately reveal that fact. The meter is tested with the same conditions under which it normally operates, and no corrections have to be made due to specific gravities of the gas which may vary from time to time or at different parts of the system.

While the apparatus has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Method for testing gas meters while same are connected to a gas distributing system, which comprises connecting the meter outlet to an envelope having non-elastic flexible walls of low heat conductivity and impervious to the gas, said envelope having a fixed predetermined volume when fully inflated by gas under pressures of the magnitude of those present in the distributing system, effecting such connection while the envelope is fully collapsed so as to contain no material amount of gas or other fluid, thereafter allowing gas to pass through the meter and into the envelope until the latter is fully inflated, and noting the amount by which the meter reading is increased by the passage of said gas in filling the envelope, for comparison of such amount with said fixed volume.

2. Method for testing gas meters by the use of a gas-tight flexible collapsible container with walls of low heat conductivity and which is expansible to a substantially fixed predetermined capacity when fully inflated by the gas pressure, comprising connecting the meter outlet to the container while collapsed to negligible capacity, thereafter allowing gas to pass through the meter and into the container until the latter is fully inflated, and comparing the amount by which the meter reading is increased by the passage of said gas, with the said predetermined capacity of the container.

3. Method for testing a gas meter, which comprises connecting the outlet thereof into a gas-tight substantially non-elastic envelope collapsed to negligible capacity, which envelope is inflatable by gas pressure to a predetermined volume of a smoothly and convexly curved shape when fully inflated, thereafter allowing gas to pass through the meter and into the envelope until the latter is fully inflated, and comparing the amount by which the meter reading is increased by the passage of said gas, with the capacity of the fully inflated envelope.

4. Method for testing a gas meter, which comprises connecting the outlet thereof into a gas-tight substantially non-elastic envelope collapsed to negligible capacity, which envelope is inflatable by gas pressure to a predetermined limited volume, then passing enough gas through the meter to bring the meter register to a predetermined mark, said gas being by-passed from entering said envelope, thereafter allowing gas to pass through the meter without any such by-passing, into the envelope until the envelope is fully inflated, and comparing the amount by which the meter reading is increased during such inflation, with the capacity of the fully inflated envelope.

5. Method for testing gas meters by the use of a gas-tight flexible collapsible container which is expansible to a substantially fixed predetermined capacity when fully inflated by the gas pressure, comprising connecting the meter outlet to the container while collapsed to negligible capacity, thereafter allowing gas to pass at a rate equal to a substantially predetermined small proportion of the "badged" capacity of the meter, through the meter and into the container until the latter is fully inflated, and comparing the amount by which the meter reading is increased by the passage of said gas, with the said predetermined capacity of the container.

ALFRED W. FULLER.

CERTIFICATE OF CORRECTION.

Patent No. 2,329,042.　　　　　　　　　　　　　　　September 7, 1943.

ALFRED W. FULLER.

It is hereby certified that error appears in the printed specification of the above numbered patent requiring correction as follows: Page 2, first column, line 49, after the numeral "2" strike out the quotation marks; line 68, for "fitting" read --fittings--; and second column, line 26, for "question" read --position--; and that the said Letters Patent should be read with this correction therein that the same may conform to the record of the case in the Patent Office.

Signed and sealed this 26th day of October, A. D. 1943.

(Seal)　　　　　　　　　　　　　　　　　　　　　　Henry Van Arsdale,
　　　　　　　　　　　　　　　　　　　　　　Acting Commissioner of Patents.